United States Patent [19]
Nigg

[11] 3,829,773
[45] Aug. 13, 1974

[54] ANALYZER PANEL
[75] Inventor: William A. Nigg, Kalamazoo, Mich.
[73] Assignee: Allen Electric and Equipment Company, Kalamazoo, Mich.
[22] Filed: Dec. 2, 1971
[21] Appl. No.: 204,085

[52] U.S. Cl.................... 324/114, 73/431, 324/156
[51] Int. Cl............................ G01r 1/00, G01r 1/04
[58] Field of Search............ 324/114, 156, 15, 16 R, 324/16 S, 16 T; D26/1 Q, 5 R; 312/223; 73/431, 116, 117.2, 117.3

[56] References Cited
UNITED STATES PATENTS
2,855,257   10/1958   Barker et al. ..................... D26/5 R OTHER PUBLICATIONS
"Scope Comparative . . . "; Heyer Ind. Inc., Belleville, N.J.; pg. 1,11; 1961.
"Radio & TV News; Aug. 1957;" pg. 12
SECO Tube Testers; Catalog of Seco Electronics, Inc., Minneapolis, Minn.; 1964

Primary Examiner—Alfred E. Smith
Assistant Examiner—Ernest F. Karlsen
Attorney, Agent, or Firm—WOodhams, Blanchard and Flynn

[57] ABSTRACT

Apparatus for automotive testing includes a cabinet including a housing for electrical test circuitry. The housing has a front wall defined by at least one recessed panel. The panel carries, in full view of the operator, instructions for making a series of tests on automotive vehicles and at least one series of switch actuating push-buttons visually keyed to such instructions and disposed adjacent the edges of the panel. Meter cases are hinged to the opposite ends of the circuitry housing and have recessed front walls which carry meters electrically connected to the circuitry in the housing. The meter cases are pivotable to close the cabinet, that is, to cover said panel, and thereby also cover said meter faces, when the apparatus is not in use. When the cabinet is opened for use, the meter faces, push-buttons and instructions are visible to the operator of the apparatus. A bracket is provided for supporting the cabinet.

11 Claims, 5 Drawing Figures

PATENTED AUG 13 1974 3,829,773
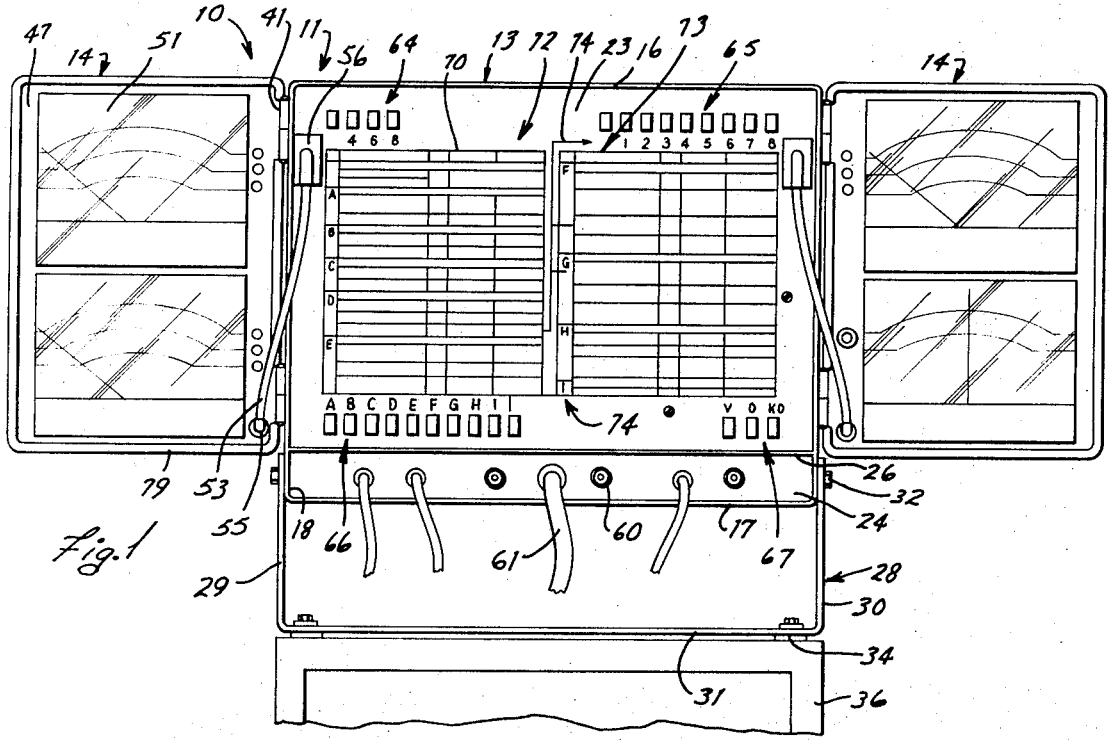
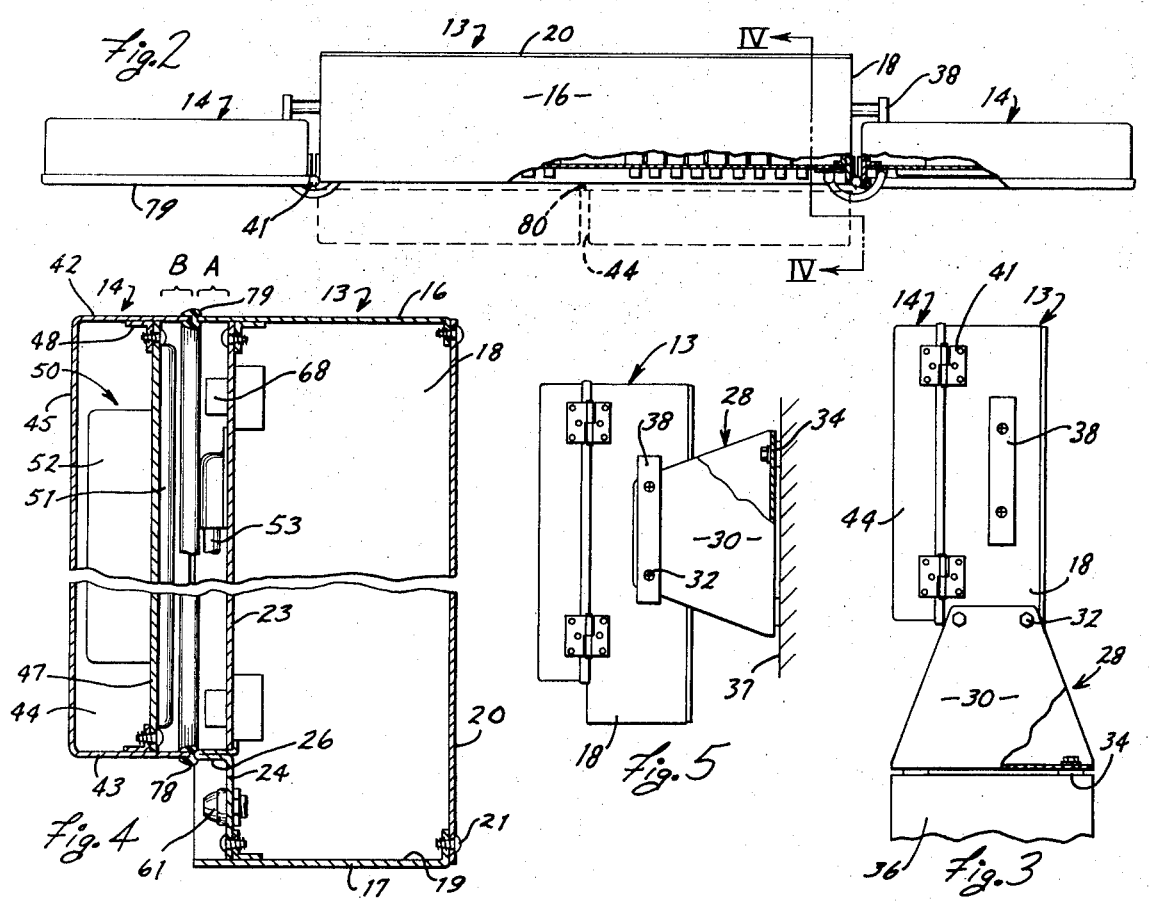

ANALYZER PANEL

FIELD OF THE INVENTION

This invention relates to automotive diagnostic test apparatus and more particularly relates to such apparatus incorporating a cabinet, which in addition to test circuitry, includes instructions for a sequence of tests, switch actuators actuatable for carrying out such tests and test readout meters or the like.

BACKGROUND OF THE INVENTION

In general, testing of an automotive vehicle, be it for determining the source of particular malfunction, general diagnostic testing or for carrying out a tune-up or the like, require use of several automotive testing devices. In the past, and even today in the case of operators of small service stations and garages, this has meant that the operator of a vehicle servicing facility will purchase and use a plurality of separate pieces of test equipment. This frequently results in substantial loss of time and effort as the individual pieces of test equipment may become scattered about the garage, and then be hard to find when needed, even be lost. When not in use, such separate pieces of test equipment are often left in unprotected locations, such as on a work bench, and may suffer damage due to careless dropping of a tool, or the like, thereon.

In response to this situation, attempts have been made in the past to provide a single piece of test equipment which will be capable of carrying out a number of automobile testing operations. However, prior apparatus of this type have often been not completely satisfactory. For example, such test apparatus often consists of a single panel on a circuitry housing carrying a maze of meter dials and other readout means, operating switches, jacks or other connections for cables to test clips, timing lights and so forth. Thus, operating personnel may have difficulty, or waste time, in interrelating switching and readout means for carrying out a given test or a series of tests. Moreover, instructions for operating such test equipment are typically provided in a separate printed booklet to which the inexperienced or careful operator may wish to refer when carrying out testing. Such requires the operator to occupy his hands with finding the requisite information by leafing through such booklet and prevents him from simultaneously actuating appropriate switches and reading appropriate meters, and the like, that is, prevents carrying out steps in a predetermined test or in a predetermined sequence of tests while referring to instructions therefor. Moreover, such instruction booklets often have no fixed storage location and thus frequently become mislaid, thereby further delaying the completion of a desired test sequence. Worse, the careless overconfident operator because of the cumbersomeness of carrying out a testing sequence while referring to the instruction book may simply attempt to carry out testing without the benefit of instructions and thereby unknowingly obtain false test information.

Accordingly, the objects of the invention include the provision of:

1. Automotive test apparatus in which instructions for carrying out a sequence of tests in proper order and for carrying out individual steps in each such sequence and switching operable to carrying out such test are presented to the operator on a single panel and wherein said switch actuators and instructions are visually keyed to each other.
2. Automotive test apparatus, as aforesaid, in which readout devices, such as meters, and connections for test probes or the like are physically as well as visually separated from the aforesaid panel while still being located close thereto during use.
3. Automotive test apparatus, as aforesaid, in which the readout devices are housed separately from at least the bulk of the remaining circuitry and other equipment associated with such test apparatus and the meter faces are pivotable with respect to the panel to enhance the visibility thereof.
4. Automotive testing apparatus, as aforesaid, in which the arrangement of the meter cases and the switch and instruction panel and the test circuitry housing provides for covering of both the meter faces and the panel face during periods of nonuse and wherein the apparatus is foldable into a compact unit, wherein the instructions, switch actuators or meters are not exposed, as for transporting or storage during periods of nonuse.
5. Automotive testing apparatus, as aforesaid, which is highly flexible as to mounting and may indeed be mounted in a variety of ways so as to be adaptable to use in a variety of garage or service station installations.

Other objects and purposes of this invention will be apparent to persons aquainted with apparatus of this general type upon reading the following specification and inspecting the accompanying drawings.

BRIEF DESRCIPTION OF THE DRAWINGS

FIG. 1. is a front elevational view of test apparatus according to the present invention and with the cabinet in an opened condition ready for use.

FIG. 2 is a partially broken, top elevational view of the apparatus of FIG. 1 and showing alternative positions of portions thereof in broken lines.

FIG. 3 is a partially broken side elevational view of the apparatus of FIG. 1 with the cabinet in a closed condition.

FIG. 4 is a fragmentary, enlarged sectional view substantially taken on the line IV—IV of FIG. 2.

FIG. 5 is a view substantially similar to FIG. 3 and showing a modification.

Certain terminology will be used in the description for convenience in reference only and will not be limiting. The words "up," "down," "right" and "left" will designate directions in the drawings to which reference is made. The words "front" and "rear" will refer to the face of the apparatus as seen in FIG. 1 and to the opposite face, respectively. The words "in" and "out" will refer to directions toward and away from, respectively, the geometric center of the device and designated parts thereof. Such terminology will include derivatives and words of similar import.

SUMMARY OF THE INVENTION

The objects and purposes of the invention are met by providing an apparatus for automotive testing includes a cabinet including a housing for electrical test circuitry. The housing has a front wall defined by at least one recessed panel. The panel carries, in full view of the operator, instructions for making a series of tests on automotive vehicles and at least one series of switch actuating push-buttons visually keyed to such instructions and disposed adjacent the edges of the panel. Meter cases are hinged to the opposite ends of the circuitry housing and have recessed front walls which carry meters electrically connected to the circuitry in the housing. The cases are pivotable to close the cabinet, that is, to cover said panel, and thereby also cover said meter faces, when the apparatus is not in use. When the cabinet is opened for use, the meter faces, push-buttons and instructions are visible to the operator of the apparatus. A bracket is provided for supporting the cabinet.

DETAILED DESCRIPTION

The apparatus 10 (FIGS. 1-3) embodying the invention includes a cabinet 11 comprising a central circuitry housing 13 and a pair of readout or meter cases 14 pivotally mounted on opposite ends of the housing 13 for purposes appearing hereinafter.

The circuitry housing 13 comprises a preferably rectangular, relatively shallow box having top and bottom walls 16 and 17 extending substantially horizontally between adjoining upstanding end walls 18 and forming a cavity 19 (FIG. 4) for housing automotive test circuitry (not shown) of any conventional nature. A removable backplate 20 (FIG. 4) closes the back of the cavity 19 and is secured to the top and bottom walls 16 and 17 and/or end walls 18 by any convenient removable means such as screws.

The front of the cavity 18 is closed by preferably coplanar upper and lower panels 23 and 24 which are recessed from the front edges of the top, bottom and end walls 16-18 by a dimension A hereinafter discussed. The upper and lower panels 23 and 24 are separated by a horizontal ledge 26 extending between the end walls 18 and forwardly from the panels 23 and 24 preferably through the aforementioned distance A. The ledge 26 may be part of one of the panels, for example panel 24.

A bracket 28 (FIGS. 1, 3 and 5) normally supports the circuitry housing 13 and preferably comprises a substantially U-shaped sheet metal member having spaced, upstanding tapered legs 29 and 30 integrally connected by a base 31. The tapered ends of the legs receive the end walls of the circuitry housing 13 snugly therebetween and are engaged thereto by suitable means, here indicated as screws 32, which normally fixedly locate the housing 13 to position same at a convenient angle for viewing. The base 31 is normally secured by any convenient means, such as screws, and including resilient insulative means, such as washers 34, to a desired support such as a portable cabinet 36 or wall 37 (FIGS. 3 and 5, respectively).

Manually engageable handles 38 (FIG. 2) are fixed to the opposed end walls of the circuitry housing 13 to assist in carrying the apparatus 10 from place to place. The handles 38 are also adapted to support cables, hereafter described, when the apparatus is transported from place to place or for storage.

Hinges 41 (FIGS. 1 and 2), preferably of a conventional quick disconnect type pivotally secure the meter cases 14 to the circuitry housing 13, the hinges 41 being fixed to the circuitry housing adjacent the forward (leftward in FIG. 3) edges of the opposed end walls 18 of the circuitry housing 13.

Each meter case 14 is substantially rectangular and comprises a top wall 42, bottom wall 43 and end walls 44, as well as a back wall 45. The hinges 41 supporting the meter cases 14 are secured to the end wall 44 thereof adjacent the forward (rightward in FIG. 3) edges thereof. The meter cases 14 are each provided with a recessed front panel 47 (FIGS. 1 and 4) spaced by a distance B (FIG. 4) from the forward or rightward edges of the top, bottom and end walls of such meter cases. The panel 47 is fixedly located with respect to the meter case by any convenient means, such as by a screw connection and suitable brackets as indicated at 48. The panel 47 of each meter case supports suiitable readout means, here shown as meters, one of which is generally indicated at 50. Each such meter has a face portion 51 located in the plane of or somewhat forwardly of the panel 47 and a body 52 located behind the panel 47 and between such panel and the back wall 45 of the meter case. The meters may be supported on the panel by any convenient means, not shown. The dimension B by which the front panel 47 is recessed in the meter case is sufficient that the faces 51 of the meter do not extend past forward edges of the walls of the meter case.

The readout devices, e.g., meters 51 of each case 14 are connected through a suitable cable 53 through the upper panel 23 of the circuitry housing 13 and thence to conventional test circuitry, not shown, therewithin. The cables 53 include connectors 55 and 56 at the front faces of the front meter case panel 47 and upper circuitry housing panel 23, respectively. At least one of such connectors 55 and 56 is preferably releasable to enable complete disconnection of the meter case from the circuitry housing. The cables 53 are of sufficient length as to allow swinging of the meter cases from their open position shown in solid lines in FIG. 2 to their closed position shown in broken lines therein. Preferably the cables 3 have a substantial vertical direction component, the connectors 55 and 56 being substantially vertically spaced to allow the necessary extra length of cable for allowing pivoting of the meter cases to be stored between the opposed panels of the meter case and circuitry housing when the meter cases are in the closed broken line position in FIG. 2.

The lower circuitry housing panel 24 is provided with ancillary test device connections including connectors for fuses as indicated at 60 and connectors for cables 61 leading to conventional test apparatus such as a timing light, releasable electrical connectors, e.g., alligator clips, etc., by means of which the circuitry within the circuitry housing 13 may be connected to various and conventional points on the engine of an automotive vehicle for testing.

The upper panel 23 (FIG. 1) of the circuitry housing 13 is provided, along the upper and lower edges thereof, with suitable sets of manually actuatable switches, as indicated for example at 64, 65, 66 and 67, such groups of switches being closely spaced from said upper and lower panel edges. In the particular embodiment shown, switches 64-67 are of a conventional push-button type, the push-buttons 68 thereof extending forwardly from the panel 23 a distance less than distance A (FIG. 4).

The bank of switches 64 preferably include several switches alternately actuatable to program into the electrical test circuitry, not shown, the number of cylinders in the tested engine. The switches 65 are alternately actuatable to select a given one of several engine cylinders for testing. The switch bank 66 includes switches labeled A, B, C, D, etc. in sequence, which are sequentially manually actuated to perform a sequence of different tests on a vehicle. The switch group 67 includes switches for controlling inputs to various meters, wherein several of such inputs may be alternately applied to a given meter, and may for example include switches selecting voltage, current and resistance readings for display.

The major area of the panel 23 is occupied by a gridwork of lines 70 contrasting to the color of the panel 23, such gridwork of lines defining a table of instructions arranged in sequence for indicating the manner in which a series of automotive tests are carried out. In the particular embodiment shown, the table comprises a first or leftward portion 72 and a second or rightward portion 73 which continues the leftward portion 72, the portions being arranged side-by-side and substantially filling the panel between the switch sets 64–67. Each of the table portions 72 and 73 is here divided into a corresponding plurality of columns corresponding, for example, to the test mode or number, instructions for carrying out that particular test, acceptable results in terms of appropriate reading and ranges of readings on the corresponding readout means and so forth.

It will be noted that the leftward-most column on each of the tables 72 and 73 that is, the column 74 carried suitable indicia, here A, B, C, D, etc. keyed to the designations for the test mode switches 66. It will be further observed by certain portions of the test instruction of table 72 and 73 may be keyed by lines, such as line 74, to appropriate switches or groups of switches, e.g., the switch group 65.

The use of such visual interconnections on the panel 23 together with the location of a full set of test instructions centered and closely located vertically between the appropriate actuating switches which must be manipulated in testing, enables the test equipment operator to rapidly and reliably carry out a sequence of tests and minimizes the operator training required. In addition, location of the readout means, e.g., meter faces directly adjacent the test instructions and more particularly to the left and the right thereof enables the operator to immediately observe the results of his particular test being carried out. The hinging of the meter cases 14 on the circuitry housing 13 enables same to be swung forwardly and at an angle from their solid line position of FIG. 2 so that the technician standing before the panel 23 will be substantially the same distance from the panel 23, the switches and the meter face and will be able to observe all with a minimum of eye movement.

The meter cases 14 are preferably provided on their forward peripheral edges 78 (FIG. 4) with resilient gaskets 79 which preferably extend substantially around the full perimeter of the front of the meter case. The top and bottom walls 42 and 43 of the meter cases 14 are horizontally aligned with the top wall 16 and ledge 26, respectively, of the circuitry housing 13. In consequence, when the meter cases are pivoted about the hinges 41 to their closed position indicated in broken lines in FIG. 2, the gaskets 79 will contact the forward edges of the circuitry housing top wall 16, ledge 26 and end walls 18. Also, the meter cases 14 are approximately half the width of the housing 13 so that the portions of the gaskets on the adjacent (1) end walls 44 of the meter cases will abut each other as generally indicated at 80 in broken lines in FIG. 2. In this way, an essentially continuous seal is establisbed with the apparatus in its closed condition between the opposed faces of the meter cases and of the circuitry housing for protecting the meter faces 51, the instruction tables 72 and 73 and switch groups 64–67 from dust or liquid damage or from mechanical damage, e.g., due to careless impacts of tools thereagainst. In addition, suitable conventional locking means (not shown) are preferably employed, e.g., for releasably connecting the back walls of the meter cases 14 to each other to hold the cabinet 11 closed and/or to prevent unauthorized use of the apparatus 10 when in its closed condition.

The cables 61 to remote test devices are all connected to the lower panel 24, which is not covered by the meter cases 14 in the closed condition of the cabinet 11. Thus, the meter cases may be moved into their closed positions without the necessity of disconnection or relocation of such cabling 61 while still preventing unauthorized use of the equipment although the cabling 61 and attached devices be left in place.

The cabinet when closed, as shown in dotted lines in FIG. 2, provides a compact assembly which fully protects the meter faces, instruction panel and switch actuators. In addition, provision of the meters in cases 14 separate from the circuitry housing 13 additionally allows the circuitry housing 13 to be made more compact, particularly more shallow, that would otherwise be possible while still housing the same amount of test circuitry. Thus, when in its open condition of FIG. 1, the cabinet is relatively shallow and intrudes to a minimum on the work space of the technician, which is desirable particularly in situations in which the working quarters are rather cramped.

OPERATION

Although the operation of the apparatus described above will be understood from the foregoing description by skilled persons, summary of such description is now given to ensure understanding for the invention.

The cabinet 11 is mounted in any desired location by suitable attachment of the bracket 28 by the mounting devices 34, for example, on a rolling table 36 or on a wall 37 of the work area.

To ready the apparatus for use, connections are made at the panel 24 to a suitable power source for the apparatus as well as to the cables 61 to which are attached conventional test clips, a timing light and so forth. The operator may at this time if he has not previously done so make the various necessary connections of the cables 61 to the engine of the vehicle being tested. The cases 14 are moved from their closed broken line positions of FIG. 2 to their fully open position of FIGS. 1 and 2, or to an intermediate position for convenient viewing by an operator. The readout devices 51 are normally connected through the cables 53 to the conventional test circuitry in the circuitry housing 13.

The operator preferably carried out a plurality of tests in an ordered sequence corresponding to the sequence of instruction blocks A, B, C, D, E, etc. on the panel 23, actuating in corresponding sequence the corresponding ones of the switches 66 indicated at A, B, C, etc.

In carrying out each test, e.g., the test A, the operator reads the instructions in the appropriate portion of the block A of table portion 72, actuates switch A of the switch group 66 and then actuates any appropriate one of the switches of groups 64, 65 and 67 in accordance with the table instructions. The operator then notes the reading or readings of the appropriate ones of the readout devices 51 and as a result of further instructions in instruction block A and/or indications on the meter faces will note whether or not a proper reading or readings is obtained. In this manner, the operator progresses through the series of tests A, B, C, D, etc.

In carrying out a given test, the rapidity with which the operator can read instructions and then set up the circuitry for the given test through actuation of the switches on the panel 23 is increased by the location of the instructions vertically between the various groups 64–67 of switches. Thus, in setting up a test the operator substantially vertically scans between the instructions and the switching to be actuated. Thereafter, when the test is underway and the operator wishes to read the test results, he will visually scan from the instruction panel in a different, here horizontal, direction to obtain the appropriate readout. Thus, operator time loss in visually searching for instructions, switches to actuate and meters to read is reduced.

Upon completion of testing and where the apparatus 10 is not to be used for an extended time period, for example at the end of the work day, the cabling 61 is detached from the last vehicle with which it has been used, power supply to the apparatus 10 may be shut off by any convenient switch means not shown and the meter cases 14 may be pivoted forwardly and inwardly to their closed positions shown in dotted lines in FIG. 2 and, if desired, locked by convenient locking means. This prevents unauthorized use of the apparatus 10, and provides protection as above discussed for the readout devices, switching and instructions on the panel 23.

Although a particular preferred embodiment of the invention has been disclosed in detail for illustrated purposes, it will be recognized that variations or modifications of the disclosed apparatus, including the rearrangement of parts, lie within the scope of the present invention.

The embodiments of the invention in which an exclusive property or privilege is claimed are defined as follows:

1. A cabinet for automotive testing apparatus comprising in combination:

a housing for test circuitry having a first front panel;

a test instruction table fixed on said first front panel;

test actuating devices on said first front panel adjacent said table;

a pair of cases at opposite ends of said housing and pivoted thereon for movement between adjacent closed positions covering said first front panel and spaced open positions flanking said housing, said cases each having a front readout panel;

test readout devices confined to said cases and substantially filling said front readout panels;

elongate flexible interconnect cables substantially parallel to the pivot axes of said cases and extending from opposed lower corners of each case front panel upwardly to points adjacent the adjacent top corners of the housing front panel for coupling said readout devices to said test circuitry in said housing;

a substantially U-shaped bracket having a base member spanning the width of said housing and mountable on a support, said bracket having parallel, spaced legs rigidly fixed to opposite end walls of said housing for positively preventing forward tilting of said housing when said cases extend forwardly of said housing intermediate their open and closed positions.

2. The device of claim 1, in which said housing panel has top and bottom margins extending the width thereof, said test instructions table being confined centrally of said housing panel substantially filling same horizontally and vertically between said margins, said test actuating devices being confined to said margins and comprising a row of switches in and extending along each margin, there being one such case movably affixed to said housing at each end thereof, for locating said readout devices to horizontally bracket said instruction table, said readout devices being confined to said cases.

3. The device of claim 2, including indicium visually keying said instructions to said switches, said test instruction table comprising first and second subtables located adjacent respective ones of said flexible cables and including a partial row of said switches located directly above and below each said subtable.

4. The device of claim 2, in which at least a pair of readout devices is provided on the front panel of each case, said readout devices being sized to substantially fill said case front panels.

5. The device of claim 1, in which said front panels of both said housing and cases are recessed, one of said cases being hinged on each end of said housing for pivotal movement about a vertical axis through about 180° from a position of use wherein said readout devices are substantially coplanar with said instructions and test actuating devices to a position of nonuse wherein the cases each cover half of said housing panel and wherein said case and housing panels are spaced from each other and substantially parallel.

6. The device of claim 1 including a second panel on said housing substantially coplanar with said first housing panel and located below said cases, cabling to test devices attachable to a vehicle to be tested, said cables connecting to said cabinet solely in said second panel, said readout device cases being hinged to said housing and being substantially coextensive in height with the first housing panel, and terminating above and in nonoverlapping relation with said second housing panel whereby said second housing panel remains exposed when said cases are hinged to a position of nonuse covering said first housing panel.

7. The device of claim 1, in which said bracket is of sheet material, said legs and base being platelike, the end walls of said housing having bottom portions downwardly extended below the lower edge of said cases, said legs overlapping said end walls only in said bottom portions, said cases extending sidewardly above and beyond the adjacent leg in use, said legs being upwardly tapered and having upper edge portions extending substantially the width of the corresponding housing end walls and being fixed thereto adjacent the forward and rearward edges of said end walls.

8. The device of claim 7, including rigid handles extending from said housing end walls behind and out of the normal path of opening movement of said cases and located to abut and back said cases in their open positions.

9. A cabinet for automotive testing apparatus comprising:
- a housing for test circuitry having a first front panel bearing test instructions and test actuating devices, said instructions being provided in the form of a table disposed centrally of said housing panel substantially filling same and located vertically between groups of said test actuating devices;
- a pair of cases fixed to opposite ends of said housing for relative motion with respect thereto and, each said case having a front panel, said front panels carrying test readout devices, so that said readout devices horizontally bracket said instruction table when said cases are open, said cases being movable to a closed position for covering said housing panel for mutual protection of said instructions, actuating devices and readout devices;
- a second panel on said housing substantially coplanar with and located below said first mentioned housing panel and provided with connections for cabling to test devices attachable to a vehicle to be tested, said readout device cases being disposed above and in nonoverlapping relation with said second housing panel so that said second housing panel remains exposed when said cases are in said closed position.

10. The device of claim 9, in which said housing and cases all include ledges extending forwardly beyond and surrounding the respective front panels thereof, one said ledge being interposed between said first and second housing panels and resilient means establishing a seal along ones of said ledges between adjacent parts of said casings and between adjacent parts of said housing and each case, for limiting entry of foreign matter into the area between such casing and housing front panels when said cases are in said closed position.

11. The device of claim 9, in which said readout devices are confined to and substantially fill said case panels, said test actuating devices comprise a series of push-button operated switches confined to first and second substantially linear and horizontal rows respectively located adjacent the top and bottom edges of said housing front panel and vertically bracekting said instruction table whereby, for carrying out a series of separate tests, the operator can set up each test by scanning substantially vertically from the instruction table to the appropriate switching to be actuated and thereafter in reading and interpreting test results can visually scan substantially horizontally between the instruction table and the readout devices to provide for a substantially uniform repetitive pattern of eye and arm movement by the operator during a multi-test sequence.

* * * * *